(12) United States Patent
Krishnan et al.

(10) Patent No.: US 10,400,936 B2
(45) Date of Patent: Sep. 3, 2019

(54) CONDUIT SYSTEM AND METHOD OF USE THEREOF

(71) Applicants: Venkat R. Krishnan, Houston, TX (US); Neerav Verma, Shenandoah, TX (US); Astrid-Cecilie Alveid Haarseth, Spring, TX (US); Timothy D. Anderson, Spring, TX (US); David A. Baker, Bellaire, TX (US); Stefanie L. Asher, Spring, TX (US)

(72) Inventors: Venkat R. Krishnan, Houston, TX (US); Neerav Verma, Shenandoah, TX (US); Astrid-Cecilie Alveid Haarseth, Spring, TX (US); Timothy D. Anderson, Spring, TX (US); David A. Baker, Bellaire, TX (US); Stefanie L. Asher, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/915,207

(22) Filed: Mar. 8, 2018

(65) Prior Publication Data
US 2018/0283597 A1 Oct. 4, 2018

Related U.S. Application Data

(60) Provisional application No. 62/479,853, filed on Mar. 31, 2017.

(51) Int. Cl.
*F16L 55/18* (2006.01)
*F16L 58/10* (2006.01)
*F16L 55/165* (2006.01)

(52) U.S. Cl.
CPC ......... *F16L 58/1036* (2013.01); *F16L 55/165* (2013.01); *F16L 55/1652* (2013.01);
(Continued)

(58) Field of Classification Search
CPC ... F16L 55/1653; F16L 55/1656; F16L 55/18; F16L 58/1036; E21B 2023/008
See application file for complete search history.

(56) References Cited

U.S. PATENT DOCUMENTS

| 4,972,880 A | 11/1990 | Strand |
| 4,986,951 A | 1/1991 | Ledoux et al. |

(Continued)

FOREIGN PATENT DOCUMENTS

| CN | 100575762 C | 12/2009 |
| WO | WO 90/03260 | 4/1990 |

(Continued)

*Primary Examiner* — James G Sayre
(74) *Attorney, Agent, or Firm* — ExxonMobil Upstream Research Company—Law Department (57) ABSTRACT

Conduit system for conveying fluids is described. The conduit system comprises a conduit, a tubular, and a sealing component. The tubular is positioned radially interior of an inner surface of the conduit along a length. The tubular comprises a polymeric material. The sealing component is positioned proximate the distal end of the tubular in an annulus formed between an outer surface of the tubular and the inner surface of the conduit, the sealing component constructed and arranged to seal the annulus. Methods for reducing corrosion of or providing pressure integrity to a conduit are also described.

23 Claims, 6 Drawing Sheets

(52) U.S. Cl.
CPC ....... *F16L 55/1653* (2013.01); *F16L 55/1656* (2013.01); *F16L 55/18* (2013.01)

(56) References Cited

U.S. PATENT DOCUMENTS

| | | |
|---|---|---|
| 5,112,211 A | 5/1992 | LeDoux et al. |
| 5,273,414 A | 12/1993 | Gargiulo |
| 5,346,658 A | 9/1994 | Gargiulo |
| 5,451,351 A | 9/1995 | Blackmore |
| 6,523,574 B1 * | 2/2003 | Taylor ................... B29C 53/086 138/97 |
| 7,241,076 B1 | 7/2007 | Cosban |
| 7,258,141 B2 | 8/2007 | Catha et al. |
| 8,567,448 B2 | 10/2013 | Stringfellow et al. |
| 8,567,450 B2 | 10/2013 | Sringfellow et al. |
| 8,590,575 B2 | 11/2013 | D'Hulster |

FOREIGN PATENT DOCUMENTS

| | | |
|---|---|---|
| WO | WO 94/28344 | 12/1994 |
| WO | WO 2006/064284 | 6/2006 |
| WO | WO 2017/061944 | 4/2017 |

* cited by examiner

CONDUIT SYSTEM AND METHOD OF USE THEREOF

CROSS REFERENCE TO RELATED APPLICATION

This application claims the benefit of U.S. Provisional Application Ser. No. 62/479,853, filed Mar. 31, 2017, the disclosure of which is incorporated herein by reference in its entirety.

FIELD

The present disclosure relates generally to a conduit system including a tubular positioned along a length of the interior of a conduit where the distal end of the tubular is not easily accessible or the dimensional characteristics of the conduit prevents using a pull-through insertion technique. In particular, a sealing component is positioned proximate the distal end of the tubular between the inner surface of the conduit and the outer surface of the tubular to anchor the tubular to the conduit and provide a seal there between.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Most pipelines used for the transportation of oil, gas, water, or mixtures of these fluids, are constructed from carbon steel. Carbon steel is a desirable material due to its availability, low cost relative to other materials, strength, toughness and ability to be welded. However, carbon steel pipes can be corroded by contact with the fluids transported within them. Almost all carbon steel pipelines have some level of corrosion of their internal surface and large costs are expended in the monitoring of corrosion, injecting chemicals into the pipeline to inhibit corrosion, and inspection of the pipeline.

Even with these mitigating activities, significant corrosion can occur, causing reduction of the pipe wall thickness. The corrosion can extend along long segments of a pipeline or may be only in localized areas. Furthermore, the corrosion may grow through the pipeline wall resulting in leaks. These leaks can sometimes be repaired by applying an external clamp around the pipeline. At times the corrosion can be so extensive that external clamps are ineffective and segments of the pipeline are instead replaced at high cost, often causing long term deferred production of hydrocarbons.

Polymeric tubulars, such as liners or reinforced thermoplastic pipes ("RTP"), have been used to provide a barrier against the deleterious effects of internal corrosion on pipelines. The polymeric tubulars are placed in direct contact with the transported fluids instead of the steel pipeline. The polymeric tubulars exhibit substantially greater corrosion resistance as compared to the host pipeline, yet provide a cost-effective alternative to pipeline replacement or the use of corrosion-resistant alloys. Additionally, rehabilitation (or remediation) of a deteriorated pipeline with a polymeric tubular can allow restoration of the full pressure rating of the pipe.

The market for tubulars for corrosion mitigation of carbon steel pipelines has matured to the point that several competing technologies are available. The vast networks of pipelines in the oil and gas industry have facilitated the development of several long distance tubular options. However, these options rely on access to both ends of the pipeline such that the tubular may be pulled through the pipeline from one end to the other end ("pull-through insertion") and secured in place at an end connection.

Types of long distance pipeline tubulars include thermoplastic or composite liners and RTPs. Such tubulars provide corrosion resistance when installed, but the variations in mechanical properties make each one of them attractive for particular applications. However, the use of tubulars to date has been limited since the tubular is pulled along the length of the pipeline from end-to-end and the strength of the tubular limits the mass of tubular that can be pulled through the pipeline. Additionally, the dimensional characteristics of the pipeline may also limit the use of a tubular. The longitudinal strength of the tubular can limit the pulling length, as the tubular can tear under its own weight since a sufficient length of tubular to run the length of the conduit is used and the frictional drag created during slip-lining of such lengths of tubular. As an example, severe bend radiuses, such as 9 conduit diameters or less, can restrict movement of the tubular through the pipeline resulting in a force having to be applied to an end of the tubular that exceeds the strength of the tubular. Thus, there is a desire to expand the use of tubulars into additional pipeline or other conduit applications where tubulars have not been readily utilized.

SUMMARY

In one aspect, the present disclosure relates to a conduit system for conveying fluids. The conduit system includes a conduit, a tubular, and a sealing component. The conduit has a first end and a distal end. The tubular is positioned radially interior of an inner surface of the conduit along a length of the conduit. The tubular comprises a polymeric material and has a first end proximate the first end of the conduit and a distal end. The sealing component is positioned proximate the distal end of the tubular in an annulus formed between an outer surface of the tubular and the inner surface of the conduit. The sealing component is constructed and arranged to seal the annulus.

In another aspect, the present disclosure relates to a method for reducing corrosion of or providing pressure integrity to a conduit used to convey a fluid. The method includes providing a conduit, inserting a tubular into the conduit, and setting a sealing component in an annulus formed between an inner surface of the conduit and an outer surface of the tubular. The sealing component is positioned proximate the distal end of the tubular and is constructed and arranged to seal the annulus.

In yet another aspect, the present disclosure relates to an offshore hydrocarbon production system including the conduit system, wherein the conduit system is a riser system.

In yet another aspect, the present disclosure relates to a method for producing hydrocarbons including providing a conduit, inserting a tubular into a conduit, setting a sealing component in an annulus formed between an inner surface of the conduit and an outer surface of the tubular, and conveying produced, unprocessed hydrocarbons via the conduit and the tubular to processing facilities. The sealing component is positioned proximate the distal end of the tubular and is constructed and arranged to seal the annulus.

DESCRIPTION OF THE DRAWINGS

While the present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present disclosure. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined unless indicated otherwise into a single functional block or element. Similarly, a single block or element illustrated in the drawings may be implemented as multiple steps or by multiple elements in cooperation unless indicated otherwise.

DETAILED DESCRIPTION

In the following detailed description section, the specific embodiments of the present disclosure are described in connection with one or more embodiments. However, to the extent that the following description is specific to a particular embodiment or a particular use of the present disclosure, this is intended to be for exemplary purposes only and simply provides a description of the one or more embodiments. Accordingly, the disclosure is not limited to the specific embodiments described below, but rather, it includes all alternatives, modifications, and equivalents falling within the true spirit and scope of the appended claims.

To the extent a term used in a claim is not defined herein, it should be given the broadest definition persons in the pertinent art have given that term as reflected in at least one printed publication or issued patent.

Certain terms are used throughout the following description and claims to refer to particular features or components. As one skilled in the art would appreciate, different persons may refer to the same feature or component by different names. This document does not intend to distinguish between components or features that differ in name only. The drawing figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also to include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

The tubular is constructed of any suitable polymeric material. In one or more embodiments, the polymeric material forms at least 50 volume percent (% v) of the tubular or at least 60% v or at least 75% v or at least 85% v, same basis. In one or more embodiments, the tubular may be a polymeric liner. The liner may be a thermoplastic liner or a reinforced (composite) thermoplastic liner. Thermoplastic liners, which are the more simple form of liners, are composed entirely of polymeric material (nonmetallic liners). The polymeric material may be selected from high density polyethylene (HDPE), medium density polyethylene (MDPE), polyamide-11, polyamide-12, polyvinylidene difluoride (PVDF), polyetheretherketone (PEEK), and combinations thereof. These thermoplastic materials have excellent formability and advantageous material properties. Thermoplastic liners are generally not strong enough to withstand long pull lengths, such as lengths of at least one mile (1.6 kilometers (km)), or independently withstand the full range of operating pressures prevalent in the hydrocarbon production industry.

Precise dimensional control of the walls of the liner during manufacturing allows the liner to conform to the inner surface of the wall of the host conduit once installed and in operation such that the liner is directly adjacent the inner surface of the host conduit. In one or more embodiments, the liners may have an average wall thickness in the range of from 0.25 inches (6.4 millimeters (mm)) to 1.25 inches (31.8 mm) or from 0.25 inches (6.4 mm) to 1 inch (25.4 mm) or from 0.33 inches (8.4 mm) to 0.75 inches (19.0 mm), such as 0.50 inches (12.7 mm). In one or more embodiments, the outer diameter of the liner may be greater than the inner diameter of the conduit to ensure a tight fit against the inner surface of the conduit upon expansion of the liner, as discussed further herein. In one or more other embodiments, the outer diameter of the liner may be slightly less than the inner diameter of the conduit such that a tight fit against the inner surface of the conduit is achieved upon expansion of the liner. In one or more embodiments, the ratio (also referred to as a dimensional ratio) of the average outer diameter of the liner to the average wall thickness of the liner may be in the range of from 5 to 50, for example for liners with an average outer diameter of less than 6 inches (15.2 centimeters (cm)) the dimensional ratio may be in the range of from 5 to 25; for liners with an average outer diameter of 6 inches (15.2 cm) to 20 inches (50.8 cm) the dimensional ratio may be in the range of from 8 to 35, for liners with an average outer diameter of greater than 20 inches (50.8 cm) the dimensional ratio may be at most 45.

Reinforced liners are similar to thermoplastic liners, however, reinforcing material is positioned within the polymer of the liner wall. The reinforcing materials may be selected from glass fiber, metallic cables or wires, carbon fiber, ultra-high molecular weight polyethylene (UHMWPE), nylon, and combinations thereof. The reinforcing materials may be introduced into an extrusion or pultrusion process used to manufacture the liner such that the reinforcing materials are embedded within the wall of the liner.

A liner can be spooled for delivery if the liner has a sufficiently small diameter, or the liner segments can be fusion welded on-site. In one or more embodiments, the liner may be temporarily reduced in size for insertion of the liner into the host conduit. Thermoplastic properties of a liner allow several options for the size reduction of the liner, including roller reduction or folding of the liner into a smaller diameter, for insertion of the liner into the conduit. In service, the host conduit is still relied upon for pressure containment, but the strength of the polymeric material of the thermoplastic liner does allow bridging of small gaps, pits, or pinholes. However, the relatively low range of mechanical strength properties of thermoplastic liners does impose limitations on the length which may be inserted into the conduit.

In one or more embodiments, the tubular may be a reinforced thermoplastic pipe (RTP). RTPs have been developed to expand the range of conditions in which tubulars may be applied. The cost of RTPs may limit their use in rehabilitation (or remediation) projects if the full extent of their properties is not necessary.

RTPs may be manufactured in a multi-step process in which successive layers are wrapped around a polymer core pipe. The polymer core pipe may be constructed of polyethylene, such as MDPE or HDPE. At least one of the successive layers is constructed of a reinforcing material and at least another of the successive layers is constructed of a polymeric material. In this way, the corrosion resistance of the polymer material can be combined with the mechanical properties afforded by reinforcing materials such as glass fiber, metallic cables or wires, carbon fiber, ultra-high molecular weight polyethylene (UHMWPE), nylon, and combinations thereof. The complexity of these systems necessitates more tooling and results in a greater cost per unit length over liners, but the superior mechanical properties grant the RTP sufficient hoop strength for independent pressure-containment. In many cases, the host conduit only serves as a conduit for running the RTP, which then acts as a self-sufficient conduit within the outer conduit. The RTPs may have an average wall thickness in the range of from 0.20 inches (5.1 millimeters (mm)) to 1.5 inch (38.1 mm) or from 0.25 inches (6.4 mm) to 1.0 inch (25.4 mm) or from 0.33 inches (8.4 mm) to 1.0 inch (25.4 mm). In one or more embodiments, the ratio (also referred to as a dimensional ratio) of the average outer diameter of the RTP to the average wall thickness of the RTP may be in the range of from 2 to 80, for example for RTPs with an average outer diameter of less than 6 inches (15.2 cm) the dimensional ratio may be in the range of from 2 to 25 or from 5 to 10; for RTPs with an average outer diameter of 6 inches (15.2 cm) to 20 inches (50.8 cm) the dimensional ratio may be in the range of from 5 to 80 or from 5 to 25, for RTPs with an average outer diameter of greater than 20 inches (50.8 cm) the dimensional ratio may be at most 75. The RTPs have a maximum outer diameter that is less than the inner diameter of the conduit providing sufficient clearance for insertion into the conduit. The outer surface of the RTPs are not directly adjacent the inner surface of the conduit as with liners and an annulus is formed between the outer surface of the RTP and the inner surface of the conduit. The outer diameter of the RTP may be chosen based on the desired inner diameter and the desired wall thickness. The wall thickness may be chosen based on the desired internal pressure of the RTP in operation. The outer diameter of the RTP may also be chosen based on the dimensional characteristics of the conduit, such as bends in the conduit where smaller outer diameters may be required to traverse a bend. The inner diameter of an RTP will be chosen based on the intended flow rates and pressures within the tubular. In situations where the RTP is utilized to rehabilitate (or remediate) a conduit used to convey hydrocarbons from an aging reservoir, the average outer diameter of the RTP may be substantially smaller than the average inner diameter of the conduit, such as a ratio of the average inner diameter of the conduit to the average outer diameter of the tubular of at least 1.5:1 or at least 2:1 or at least 2.5:1 or at least 3:1. Using such a small diameter RTP as the tubular can prolong the life of the field since a sufficient pressure may be maintained in the tubular to convey the produced hydrocarbons to the processing facilities. In one or more embodiments, the average outer diameter of an RTP may be in the range of from 3 inches (7.6 cm) to 20 inches (50.8) or from 4 inches (10.2 cm) to 6 inches (15.2 cm) or from 6 inches (15.2 cm) to 12 inches (30.5 cm).

In one or more embodiments, the conduit system may include at least a first section of the conduit and a second section of the conduit. The first section is in fluid communication with the second section. The tubular may extend along at least a portion of the first section or may extend along substantially the entire the length of the first section and at least a portion of the second section. In one or more embodiments, the tubular may extend along substantially the entire length of the first section of the conduit and the second section of the conduit. The conduit may be any suitable conduit used to convey fluids, such as a pipeline, subsea riser, subsea flowline, and combinations thereof. In one or more embodiments, the conduit may be used to convey produced, unprocessed hydrocarbon fluids from subsea equipment to a processing facility. The offshore processing facility may be a vessel or platform near the subsea equipment. In one or more other embodiments, the conduit may be used to convey processed hydrocarbon fluids from the offshore processing facility to a storage unit or onshore facilities. The storage unit may be an onshore storage tank, a subsea storage tank or a transport tanker with storage tanks. The hydrocarbon fluids may include crude oil, gas, and/or gas condensates produced from a reservoir in the subterranean formation. In one or more other embodiments, the conduit may be used to convey fluids in a transmission pipeline from a source of the fluid to be transported, such as a storage unit or fluid processing facilities, to a storage unit or an end use application for the transported fluid.

In one or more embodiments, the conduit may include a substantially vertical section and a substantially horizontal section. The conduit system may include a bend in the substantially vertical section proximate the substantially horizontal section. The bend may have a severe bend radius such as a bend radius of less than 9 conduit diameters, or less than 7 conduit diameters, or less than 5 conduit diameters, or less than 3 conduit diameters. The conduit diameter being the inner diameter of the conduit at the bend. A bend having a severe bend radius does not have the tubular positioned within the conduit along the severe bend radius. The tubular may be positioned upstream of such bend, downstream of such bend, or both.

Figure 1:
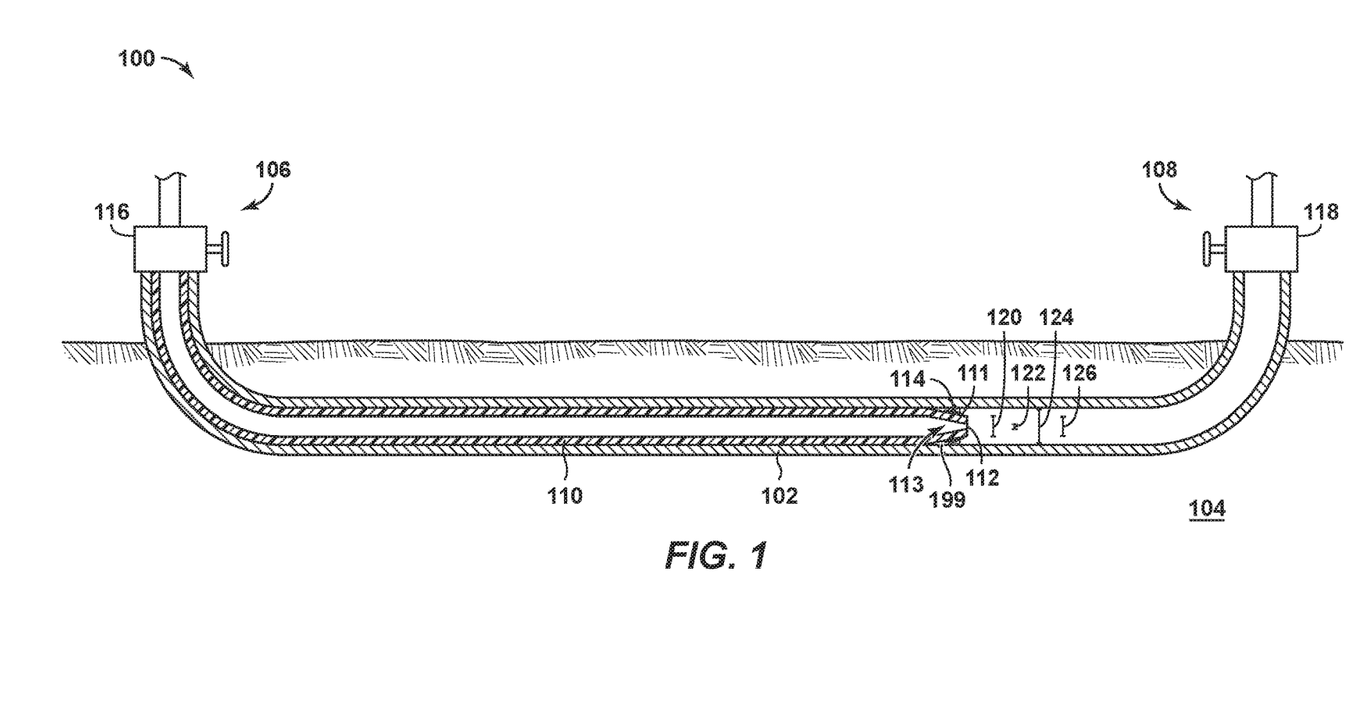
FIG. 1 illustrates a conduit system including a pipeline in accordance with one or more embodiments of the present disclosure.

In one or more embodiments, the conduit system is a transmission pipeline system to convey processed fluids, such as processed hydrocarbons. The conduit is a pipeline. The pipeline is configured such that at least a portion of the pipeline is disposed within a subterranean formation and either the length of the pipeline or the dimensional characteristics of the pipeline (e.g., a severe bend radius or access to an end of the pipeline is restricted) prevents use of pull-through insertion of the tubular. The transmission pipeline system may be an onshore pipeline system or an offshore pipeline system. FIG. 1 illustrates an embodiment of a transmission pipeline according to one or more embodiments of the present disclosure. The pipeline system 100 has a pipeline 102 (shown in cross-section from a side-view orientation) disposed within the subterranean formation 104. Pipeline 102 has a first end 106 and a distal end (second end) 108. The first end 106 may be in fluid communication with a source of fluid (not shown) to be transported, such as a storage unit or fluid processing facilities. The distal end 108 may be in fluid communication with a storage unit or an end use application (not shown) for the transported fluid. The distal end 108 may be inaccessible such that pull-through insertion of a tubular is not a viable option. As used herein, inaccessible is meant to include configurations where access to an end of the conduit is not available or access is difficult due to structures surrounding the end of the conduit. Although not illustrated, in other embodiments, the distal end 108 may be readily accessible, however, the pipeline may include a severe bend radius, as discussed herein, such that pull-through insertion of a tubular is not a viable option. In such embodiments, the tubular is inserted from the end providing access (first end) to the portion of the conduit to be protected with the tubular and avoiding the tubular having to traverse the severe bend radius. The tubular may be attached to the first end of the conduit using any suitable method known in the art, such as a flanged attachment. Referring to FIG. 1, valve 116 controls the fluid flow into pipeline 102 and valve 118 controls the fluid flow out of pipeline 102. Pipeline system 100 includes a liner 110 (shown in cross-section from a side-view orientation) disposed within the pipeline and directly adjacent the inner surface of the wall of the pipeline 102 substantially the entire length of liner 110. Proximate the distal end (second end) 112, liner 110 includes a transition section 113 with a reduced diameter to accommodate a sealing component 114. A metal sleeve 111 is positioned directly adjacent an outer surface of liner 110 in transition section 113 and sealing component 114 is positioned circumferentially around an outer surface of metal sleeve 111 within annulus 199 formed between a portion of the outer surface of liner 110 or metal sleeve X111 and a portion of the inner surface of pipeline 102. Metal sleeve 111 provides additional support for the sealing component 114. The transition section includes a continuous transition from a first inner diameter 120 to a second inner diameter 122 of the liner to form a smooth inner surface and a continuous transition from a first outer diameter 124 to a second outer diameter 126 to form a smooth outer surface. The first inner diameter 120 is greater than the second inner diameter 122. The ratio of the first inner diameter 120 to the second inner diameter 122 is chosen such that no turbulent flow is created in the liner 110. The thickness of the wall of the liner may be the same along the entire length or the thickness of the wall of the liner may be increased in the transition section to provide additional support for the sealing component. Such increase in wall thickness in the transition section may result in a ratio of the liner wall average thickness radially adjacent the sealing component to the liner wall average thickness outside of the transition section being at least 2:1 or at least 3:1.

In one or more embodiments, the conduit system may be a riser system. The conduit may include a riser section and a flowline section. The riser section may extend from proximate the surface of the body of water to proximate the seabed. The flowline section may extend from proximate the riser section along a length of the surface of the seabed. The flowline may be positioned above (and proximate to) the surface of the seabed or positioned beneath (and proximate to) the surface of the seabed. The riser section is in fluid communication with the flowline section. The tubular may extend along at least a length of a riser section or at least a length of the flowline section, depending on the configuration of the conduit and which end of the conduit the tubular is inserted. In one or more embodiments, the tubular may extend along substantially the entire the length of a riser section and at least a portion of the flowline section. In one or more embodiments, the tubular may extend along substantially the entire length of a riser section of the conduit and the flowline section of the conduit.

Figure 2:
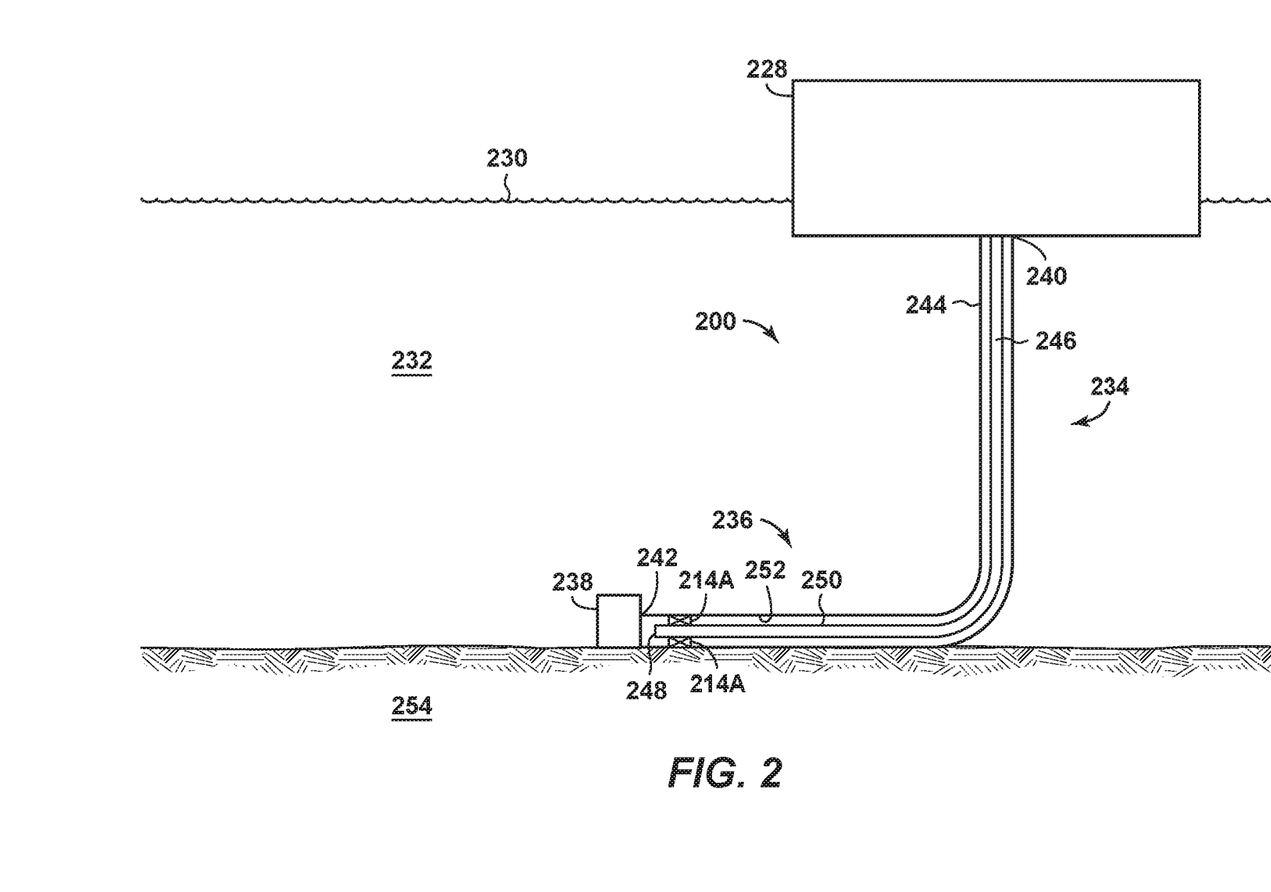
FIG. 2 illustrates a riser system in accordance with one or more embodiments of the present disclosure.

In one or more embodiments, the distal end of the flowline section (farthest from the riser section) may be proximate to and in fluid communication with subsea equipment. The subsea equipment may be proximate the surface of the seabed. The subsea equipment may be selected from a wellhead, a manifold, a subsea separator, a flowline end terminal (FLET), a production line end terminal (PLET), or a flowline junction device. It is understood that the term flowline as used herein is meant to include production lines used in subsea operations. As illustrated in FIG. 2, a vessel 228 for the production of hydrocarbons is positioned on the surface 230 of body of water 232. Vessel 228 is connect to riser system 200. Riser system 200 (shown in cross-section from a side-view orientation) includes a conduit 244 having a riser section 234 and a flowline section 236. Riser section 234 of conduit 244 is connected to vessel 228 at end 240 which is in fluid communication with processing equipment (not shown) on vessel 228. Flowline section 236 of conduit 244 is positioned proximate the seabed 254 and connected to and in fluid communication with subsea equipment 238 at distal end (second end) 242 of conduit 244. Tubular 246 is disposed within conduit 244 along substantially the entire length of conduit 244. Tubular 246 is a RTP. Tubular 246 terminates proximate distal end 242 of conduit 244 and is in fluid communication with conduit 244 at distal end 242. Packer 214A is utilized as the sealing component and is positioned proximate the distal end (second end) 248 of tubular 246 between a portion of the outer surface 250 of tubular 246 and a portion of the inner surface 252 of conduit 244.

Figure 3:
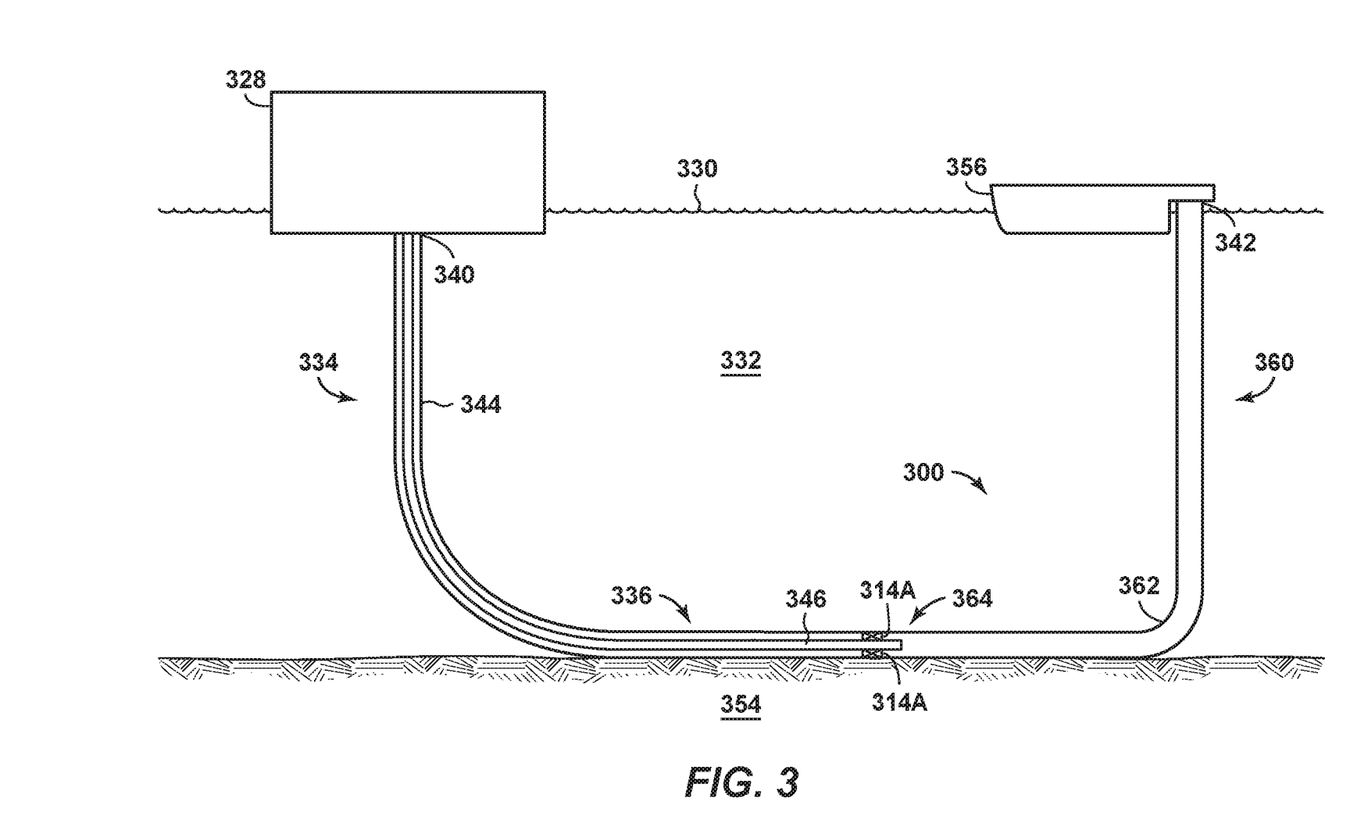
FIG. 3 illustrates a riser system in accordance with one or more embodiments of the present disclosure.

In one or more other embodiments, the flowline may extend from the riser section along a length of the seabed and end proximate an additional riser section. The additional riser section extends from proximate the flowline section at the seabed to proximate the surface of the body of water. The flowline section is in fluid communication with the additional riser section. The tubular may be positioned along at least a portion of the riser section or the additional riser section or may be positioned along at least the riser section or the additional riser section and at least a portion of the flowline section of the conduit. In the event the riser section includes a severe bend radius, as discussed herein, the tubular may be positioned along at least a portion of the additional riser section or along the additional riser section and at least a portion of the flowline section of the conduit. In the event the additional riser section includes a severe bend radius, as discussed herein, the tubular may be positioned along at least a portion of the riser section or along the riser section and at least a portion of the flowline section of the conduit. As illustrated in FIG. 3, riser system 300 (shown in cross-section from a side-view orientation) includes conduit 344 which extends between vessel 328 and transport tanker 356 which is positioned on the surface 330 of body of water 332. End 340 of conduit 344 is proximate (and in fluid communication with) vessel 328 and end 342 of conduit 344 is proximate (and in fluid communication with) transport tanker 356. Conduit 344 includes a riser section 334, a flowline section 336, and an additional riser section 360. Here, the flowline section 336 is shown positioned proximate the seabed 354. Additional riser section 360 includes a severe bend radius 362. Therefore, tubular 346 extends from proximate end 340 of conduit 344 proximate vessel 328 to a location 364 along the length of flowline section 336. Packer 314A is positioned proximate location 364.

In one or more embodiments, the riser section and the flowline section of the conduit may convey processed hydrocarbons and the flowline section may extend proximate (and in fluid communication with) onshore facilities for storage or further processing. In such a configuration, the tubular may be inserted from the end (first end of the conduit) of the flowline section (first section) that is proximate the onshore facilities and extend along at least a portion of the length of the flowline.

Figure 4:
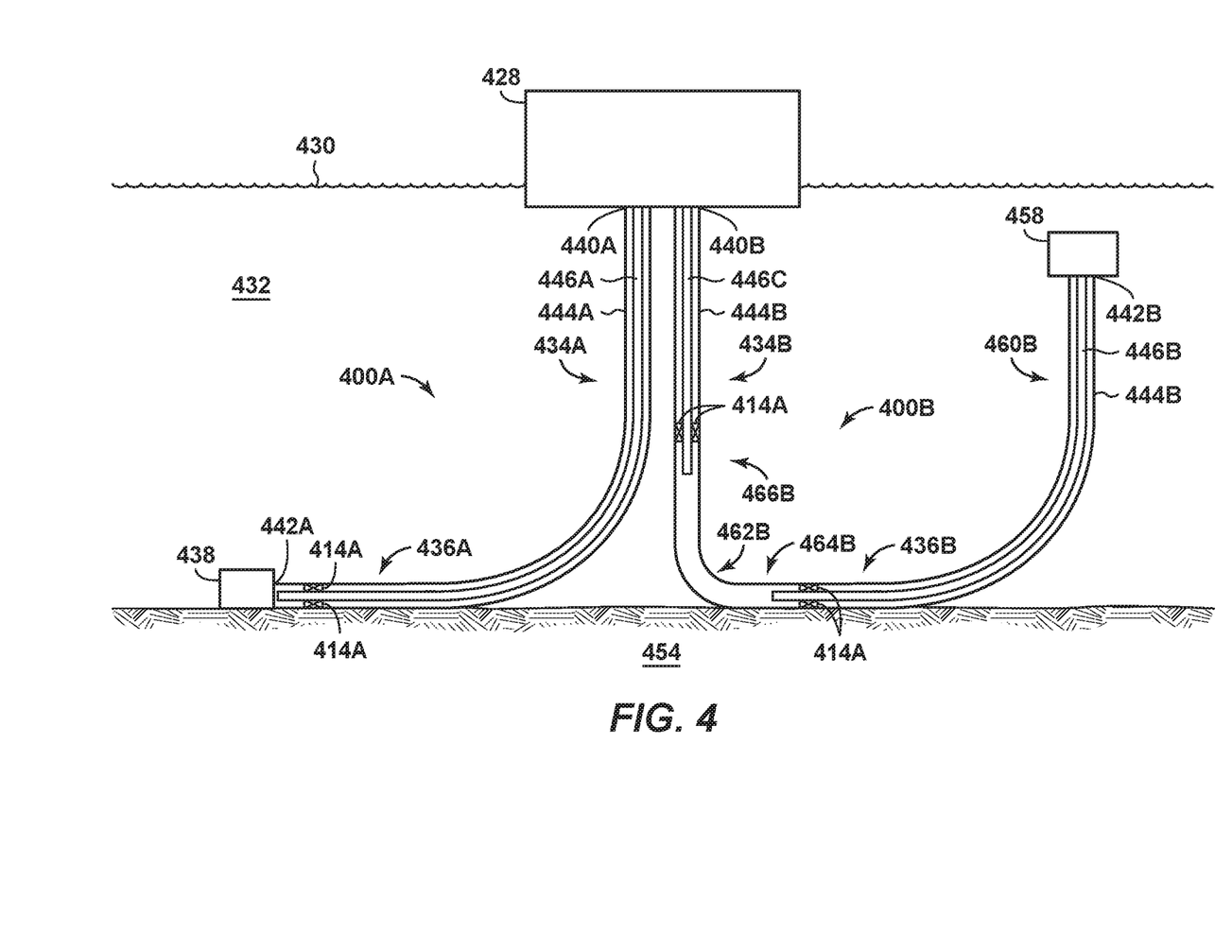
FIG. 4 illustrates a hydrocarbon production system including two riser systems in accordance with one or more embodiments of the present disclosure.

FIG. 4 illustrates a hydrocarbon production system including two riser systems (the riser systems shown in cross-section from a side-view orientation). The first riser system 400A is similar to riser system 200 of FIG. 2. Conduit 444A of the first riser system 400A includes riser section 434A and flowline section 436A. Here, the flowline section 436A is shown positioned proximate the seabed 454. End 440A of conduit 444A is proximate (and in fluid communication with) vessel 428, which is positioned on the surface 430 of body of water 432, and end 442A is proximate (and in fluid communication with) subsea equipment 438. Tubular 446A extends from proximate (and in fluid communication with) vessel 428 at end 440A of conduit 444A to proximate (and in fluid communication with) subsea equipment 438. A packer 414A is positioned proximate end 442A. The second riser system 400B is similar to riser system 300 of FIG. 3. Conduit 444B of the second riser system 400B includes riser section 434B, flowline section 436B, and additional riser section 460B. Here, the flowline section 436B is shown positioned proximate the seabed 454. End 440B of conduit 444B is proximate (and in fluid communication with) vessel 428 and end 442B is proximate (and in fluid communication with) turret 458. Turret 458 may be used to connect to a transport tanker (not shown) used to transport the hydrocarbons processed on vessel 428. The second riser system 400B has a severe bend radius 462B in riser section 434B. In order to accommodate the severe bend radius 462B, tubular 446B extends from proximate (and in fluid communication with) turret 458 at end 442B of conduit 444B to a location 464B along the length of flowline section 436B and tubular 446C extends from proximate (and in fluid communication with) vessel 428 to a location 466B along the length of riser section 434B above severe bend radius 462B. A packer 414A is positioned proximate location 466B. A packer 414A is also placed proximate location 464B.

The conduit of the conduit system may be constructed of any suitable metal, such as carbon steel. The term "metal" as used herein includes metals and metal alloys. In one or more embodiments, the metal component forms at least 50 volume percent (% v) of the conduit or at least 60% v or at least 75% v or at least 85% v, same basis. In one or more embodiments, the average outer diameter of the conduit may be in the range of from 3 inches (7.6 cm) to 52 inches (132.1 cm) or from 4 inches (10.2 cm) to 20 inches (50.8) or from 4 inches (10.2 cm) to 6 inches (15.2 cm) or from 6 inches (15.2 cm) to 12 inches (30.5 cm).

In one or more embodiments, the riser section or the additional riser section of a riser system may comprise a rigid riser or a flexible riser. A rigid riser may include multiple sections of metal pipe joints girth welded (circumferential weld) together in an end-to-end configuration. A flexible riser may include a composite composition comprising an innermost carcass layer, an inner sheath, an outer sheath, and one or more armor wire layers positioned between the inner sheath and the outer sheath. The carcass layer and the armor wire layers are constructed of metal and the inner sheath and the outer sheath are constructed of a polymer material. The polymer material of the inner sheath and the outer sheath of the flexible riser may be any suitable polymer material capable of preventing fluid intrusion into the annulus formed between the inner and outer sheaths.

In one or more embodiments, the conduit system may include a propulsion component. The propulsion component may be attached proximate the distal end of the tubular and is constructed and arranged to provide a forward force to assist insertion of the tubular into the conduit. The propulsion component may be constructed of any suitable material, such as a metal, polymeric material, or a composite material. In one or more embodiments, the propulsion component may provide a fluid force by including at least one nozzle disposed on an exterior, rearward-facing surface (with respect to the direction of insertion) of the propulsion component. The at least one nozzle is in fluid communication with a pressurized propulsion fluid. The nozzle may be oriented such that the centerline of the orifice (when viewed in cross-section from a side-view orientation) of the nozzle forms an angle θ with the longitudinal axis of the tubular (formed between the longitudinal axis of the tubular as it extends ahead of the propulsion component and the centerline of the orifice) of greater than 90 degrees, such as an angle θ of at least 100 degrees, at least 110 degrees, at least 120 degrees, or at least 135 degrees. In one or more embodiments, the centerline of the nozzle orifice may be parallel to the longitudinal axis of the tubular or may form an angle θ of at most 270 degrees or at most 225 degrees. The pressurized propulsion fluid may be provided via the tubular or via a separate propulsion fluid line provided within the tubular or within the conduit exterior to the tubular. In embodiments where the tubular is a liner and the liner is used to provide pressurized propulsion fluid (i.e., not fully collapsed), the pressure of the propulsion fluid is sufficient to assist the insertion of the liner but less than the pressure required to expand the outer surface of the liner into contact with the conduit. In embodiments where the tubular is a RTP and the RTP is used to provide pressurized propulsion fluid, the pressure of the propulsion fluid is sufficient to assist the inserting of the RTP but less than the pressure rating of the RTP. Thus, the pressure of the propulsion fluid used with a RTP may be substantially greater than the pressure of the propulsion fluid used with a liner.

The propulsion component may be attached in any suitable manner known in the art capable of permanently or temporarily attaching the propulsion component to a surface of the tubular. In one or more embodiments, the propulsion device may be permanently attached to the tubular, for example when the propulsion component is positioned circumferentially around the tubular and is left in the annulus or where the propulsion component is drilled through to remove or where the propulsion component is made of a degradable material. Examples of permanent attachment may include threaded attachment, flanged attachment, adhesive attachment, welded attachment, and the like. In one or more other embodiments, the propulsion component may be temporarily attached to the tubular using a swage arrangement constructed and arranged such that the pressurized propulsion fluid forces a sloped surface of the swage arrangement having the greater diameter against the inner surface of the tubular or having the lesser diameter against the outer surface of the tubular and in the absence of the pressurized propulsion fluid the sloped surface of the swage arrangement with the lesser diameter allows the attachment to loosen from the inner surface of the tubular or with the greater diameter allows the attachment to loosen from the outer surface of the tubular such that the propulsion component may be collapsed and withdrawn from the conduit. Although a swage arrangement has been described as an example of a temporary attachment for the propulsion component, any other suitable methods for temporarily attaching components which are known in the art may be used to attach the propulsion component to the tubular.

Figure 5:
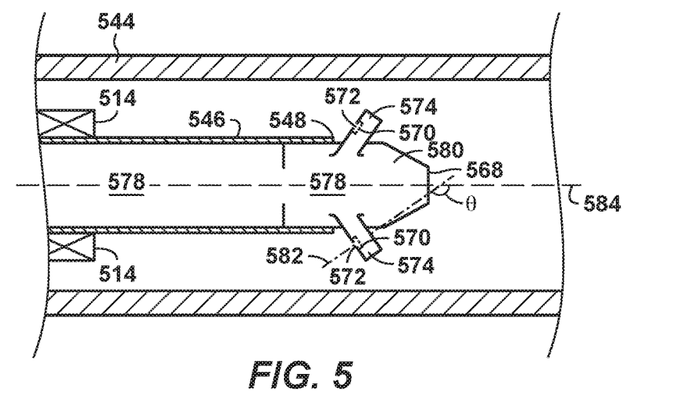
FIG. 5 illustrates a tubular including a propulsion component in accordance with one or more embodiments of the present disclosure.

In one or more embodiments, the propulsion component may include at least one retractable section constructed and arranged to extend from the interior of the propulsion component in the presence of pressurized propulsion fluid and to retract into the interior of the propulsion component when no pressurized propulsion fluid is present. As illustrated in FIG. 5 in cross-section from a side-view orientation, propulsion component 568 is attached at the distal end (second end) 548 of tubular 546. Pressurized fluid 578 is provided within tubular 546 and causes the retractable sections 574 to extend from the interior 580 of propulsion component 568. Each retractable section 574 includes a nozzle 570 in fluid communication with the interior 580 of propulsion component 568. Pressurized fluid 578 exiting orifice 572 of nozzle 570 provides the forward force to assist insertion of tubular 546 into conduit 544. The centerline 582 of orifice 572 forms an angle θ with the longitudinal axis 584 of tubular 546. A portion of sealing component 514 is shown attached to the outer surface of tubular 546.

Figure 6:
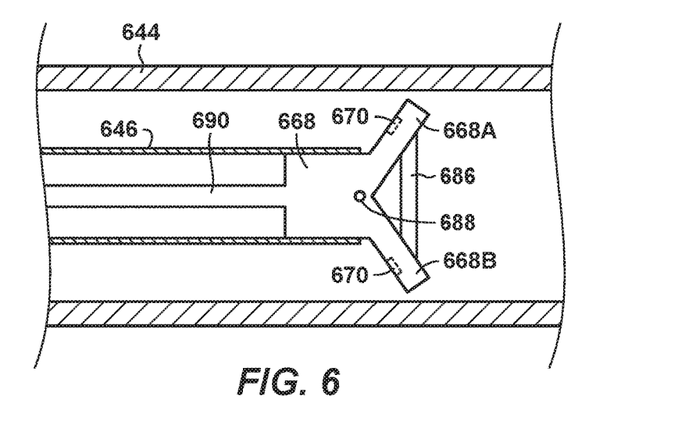
FIG. 6 illustrates a tubular including a propulsion component in accordance with one or more embodiments of the present disclosure.
Figure 7:
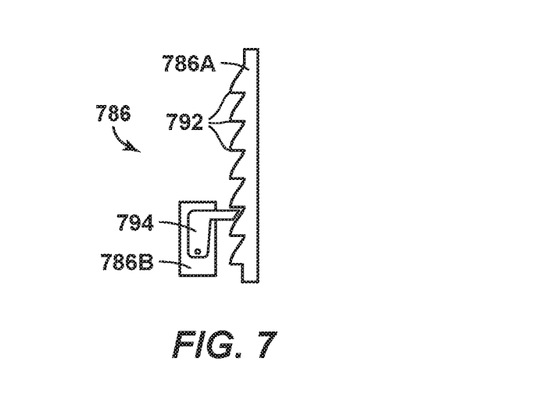
FIG. 7 illustrates a ratcheting arrangement in accordance with one or more embodiments of the present disclosure.

In one or more other embodiments, the propulsion component may include two sections which pivot about a hinge and may be expanded radially outward of the outer surface of the tubular by a mechanical force applied by a ratcheting arrangement extending between the two sections. The ratcheting arrangement includes a release such that, when the insertion of the tubular into the conduit is complete, the ratcheting arrangement may be collapsed which allows the two sections of the propulsion component to also collapse facilitating withdrawal of the propulsion component through the interior of the tubular. As illustrated in FIG. 6 in cross-section from a side-view orientation, propulsion component 668 includes two sections 668A, 668B which are pivotally connected via hinge 688. Ratcheting arrangement 686 extends between section 668A and section 668B of propulsion component 668. Each of the two sections 668A, 668B include a nozzle 670 in fluid communication with propulsion fluid line 690 positioned within the interior of tubular 646. Tubular 646 is positioned within conduit 644. FIG. 7 illustrates an embodiment of ratcheting arrangement 786 shown in cross-section from a side-view orientation. Ratcheting arrangement 786 includes teeth 792 on a first section 786A of the ratcheting arrangement 786. Pawl 794 is attached to a second section 786B of ratcheting arrangement 786 and includes a spring (not shown). Pawl 794 is constructed and arranged to directly interact with teeth 794 when extending the ratcheting arrangement 686 and the associated two sections 668A, 668B of propulsion component 668 to prevent downward movement. Ratcheting arrangement 786 includes a release (not shown) to allow downward movement of first section 686A to collapse the associated two sections 668A, 668B.

Figure 8:
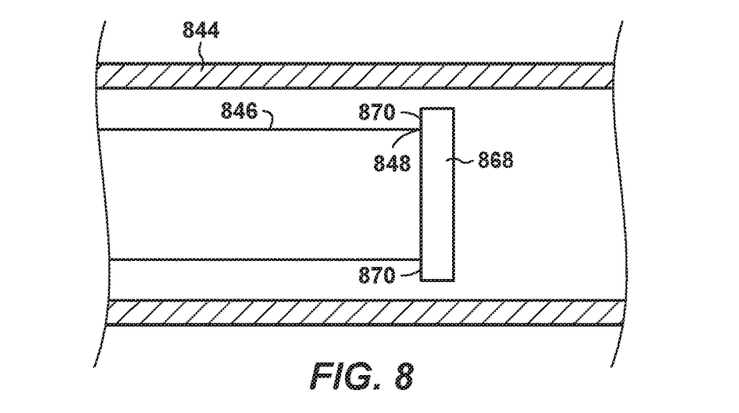
FIG. 8 illustrates a tubular including a propulsion component in accordance with one or more embodiments of the present disclosure.

FIG. 8 illustrates another embodiment of the propulsion component shown in cross-section from a side-view orientation. Propulsion component 868 is attached at the distal end (second end) 848 of tubular 846 and includes a plurality of rearward-facing nozzles 870 (two of which are shown) circumferentially spaced around the exterior of the outer surface of tubular 846. The centerlines of the nozzle orifices (not shown) are parallel to the longitudinal axis (not shown) of the tubular 846. Tubular 846 is positioned within conduit 844.

Figure 9:
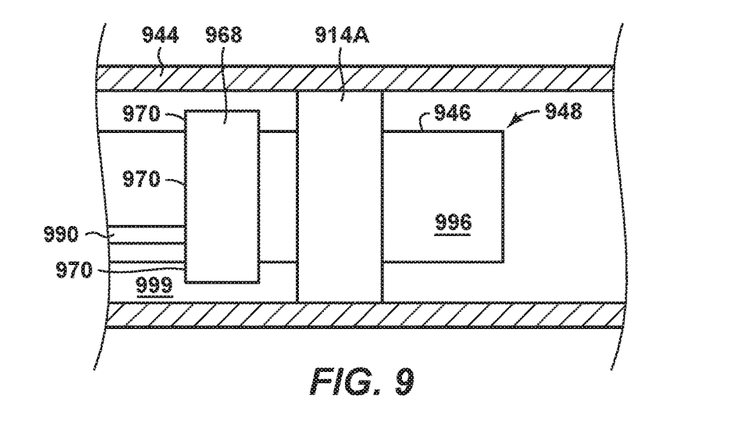
FIG. 9 illustrates a tubular including a propulsion component in accordance with one or more embodiments of the present disclosure.

In one or more other embodiments, the propulsion component may be positioned circumferentially around the tubular proximate the distal end. As illustrated in FIG. 9 in cross-section from a side-view orientation, propulsion component 968 extends circumferentially around tubular 946 proximate distal end (second end) 948 of tubular 946 within annulus 999. Propulsion component 968 includes a plurality of nozzles 970 circumferentially spaced around tubular 946. The centerlines of the orifices (not shown) of the nozzles are parallel to the longitudinal axis (not shown) of the tubular. Pressurized fluid is provided to propulsion component 968 via propulsion fluid line 990 which is positioned along an exterior surface 996 of tubular 946. With this configuration, the propulsion component 968 may be left in place and not removed from conduit 944. Packer 914A is illustrated as set in place and is positioned between propulsion component 968 and distal end 948.

The sealing component may be formed of any suitable material constructed and arranged to form a circumferential seal with the inner surface of the conduit wall and extend between the inner surface of the conduit and an outer surface of the tubular. In one or more embodiments, the sealing component may be a swellable packer. A swellable packer may be constructed of an elastomer material that expands radially upon contact with a particular type of fluid, such as an oil-based fluid (elastomer material an oil-swellable material) or a water-based fluid (elastomer material a water-swellable material). In one or more embodiments, when using a propulsion component and a propulsion fluid that can trigger swelling of the elastomer material of the swellable packer, the swelling of the elastomer material may be time delayed to prevent premature swelling and allow for installation of the tubular within the conduit before the seal is set. In one or more other embodiments, when using a propulsion component, the propulsion fluid utilized is a fluid that does not trigger swelling of the elastomer material of the swellable packer. As an example, the propulsion fluid may be a water-based fluid and the elastomer material may be an oil-swellable material or vice versa. The swellable packer, prior to swelling and setting in place, has a thickness such that, upon contact with a particular type of fluid, sufficient elastomer is present to radially expand into contact with the inner surface of the conduit wall to form a seal.

In one or more other embodiments, the sealing component may be a mechanical packer. A mechanical packer may be circumferentially disposed around the tubular and activated once in position to radially expand to form a seal with the inner surface of the conduit wall. The outer sealing surface of the mechanical packer may include a polymer material, such as a rubber material, to form the sealing surface with the inner surface of the conduit wall. The mechanical packer may be activated (expanded) according to techniques known in the art of wellbore packers. In one or more embodiments, the mechanical packer may be hydraulically activated (hydraulically set) using hydraulic pressure provided from a hydraulic source in fluid communication with the mechanical packer to radially expand the mechanical packer. In one or more other embodiments, the mechanical packer may be hydrostatically activated (hydrostatically set) using the hydrostatic pressure within the conduit to radially expand the mechanical packer. In one or more other embodiments, the mechanical packer may be mechanically activated using a wireline set, a tension set, or a compression set to radially expand the mechanical packer. The mechanical packer or swellable packer may be a permanent packer or a retrievable packer.

Figure 10:
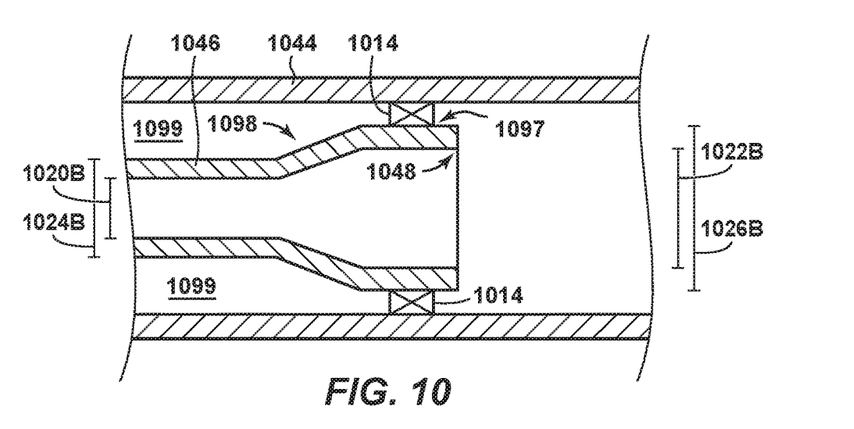
FIG. 10 illustrates a tubular in accordance with one or more embodiments of the present disclosure.

In one or more embodiments, the distal end of the tubular may have a configuration as illustrated in FIG. 10 in cross-section from a side-view orientation. The transition section 1098 proximate the distal end (second end) 1048 of tubular 1046 may include an expanded diameter to reduce the radial dimension of the annulus 1099 proximate the end section 1097 which allows for a reduced thickness of sealing component 1014 to be used to seal the annulus 1099 from the conduit 1044 not containing the tubular 1046. The transition section 1098 includes a continuous transition from a first inner diameter 1020B to a second inner diameter 1022B of tubular 1046 to form a smooth inner surface and a continuous transition from a first outer diameter 1024B to a second outer diameter 1026B to form a smooth outer surface. Following the transition section 1098, an end section 1097 includes a substantially uniform wall thickness that is greater than the average wall thickness of the main portion of tubular 1046. The second outer diameter 1026B is greater than the first outer diameter 1024B of tubular 1046. The second inner diameter 1022B may be the same as (not shown) or greater than the first inner diameter 1020B of tubular 1046. The thickness of the wall of the tubular may be the same along the entire length of the tubular (not shown) or the thickness of the wall of the tubular may be increased in the end section 1097 to provide additional support for the sealing component. The increase in wall thickness in the end section may result in a ratio of the tubular wall average thickness radially adjacent the sealing component to the tubular wall average thickness of the main portion of the tubular being at least 2:1 or at least 3:1.

The tubular may be utilized in a new installation of conduit to prevent corrosion issues or pressure integrity issues or the tubular may be utilized to rehabilitate (or remediate) a used conduit having corrosion issues, pressure integrity issues, or both in one or more areas of the conduit. When utilizing the tubular for preventing or mitigating corrosion issues, the polymeric material of the tubular has a greater corrosion resistance than the conduit. When utilizing the tubular for preventing or mitigating pressure integrity issues, the polymeric material and dimensions of the tubular are chosen to accommodate the desired operating pressures within the tubular. Corrosion issues may include any form of corrosion that impacts the integrity of the conduit resulting in pitting, crevices, and/or wall loss. Pressure integrity issues may result from wall loss, mechanical damage, and/or cracking.

The method for reducing corrosion of or providing pressure integrity to a conduit used to convey a fluid includes providing a conduit, inserting a tubular into the conduit, and setting a sealing component in the annulus formed between an inner surface of the conduit and an outer surface of the tubular. In one or more embodiments, inserting the tubular into the conduit may utilize gravity, an injector, a propulsion component, and combinations thereof to assist the insertion of the tubular.

In embodiments utilizing a liner as the tubular, the method may include folding and securing the liner into a collapsed form prior to insertion into the conduit which reduces the diameter of the liner during insertion. In other embodiments, the method may include roller reduction to temporarily reduce the outer diameter of the liner. Upon completion of the insertion of the tubular into the conduit, fluid is introduced into the liner at a pressure sufficient to expand the liner to be directly adjacent the inner surface of the conduit along substantially the entire length of the liner. The liner is expanded into contact with the inner surface of the conduit such that the conduit can assist in containing the pressurized fluids conveyed within the liner.

In embodiments utilizing a propulsion component to assist in inserting the tubular into the conduit, the method may include attaching the propulsion component proximate to the distal end (the end to be first inserted) of the tubular. During insertion into the conduit, pressurized fluid is introduced into the propulsion component via the tubular or a separate propulsion fluid line in fluid communication with a source of propulsion fluid. Once the tubular is in position, all or a portion of the propulsion component may be removed from the distal end of the tubular.

In one or more embodiments, a propulsion component attached to and covering the distal end of the tubular, such as shown in FIG. 8, may be removed by drilling an opening through the propulsion component. Such opening may be of a diameter suitable for conveying fluids at the desired pressure. In such embodiments, a drill bit may be provided via a wireline, a coiled tubing, or any other suitable means to create the opening in the propulsion component. In one or more embodiments, a bi-directional pig may be deployed through the tubular to remove fragments of the propulsion component. In one or more other embodiments, the fluids conveyed within the conduit and tubular may be used to remove fragments of the propulsion component, as discussed herein.

In one or more other embodiments, a propulsion component, which is constructed using a degradable material, and attached to and covering the distal end of the tubular may be removed by contacting the propulsion component with a fluid suitable to degrade the material forming the propulsion component such that it breaks apart and may be removed from within the conduit. In one or more embodiments, fluids conveyed within the conduit and tubular may be used to remove fragments of the propulsion component. A filter in fluid communication with the conduit and tubular may be used to catch and retain such fragments carried by the conveyed fluid. In one or more other embodiments, a bi-directional pig may be deployed through the tubular to remove fragments of the propulsion component. The degradable material of the propulsion component may not degrade in the presence of the propulsion fluid or degradation of the degradable material is time delayed such that the propulsion component remains intact during insertion of the tubular. In one or more embodiments, the degradable material may degrade upon contact with the fluids to be conveyed in the conduit. In one or more embodiments, the degradable material may be a polymer material that degrades from contact with a hydrocarbon fluid to be conveyed, such as crude oil, gasoline, diesel, or combinations thereof.

In one or more embodiments, a propulsion component may be removed by releasing the propulsion component from the tubular, retracting any retractable sections within the interior of the propulsion component and/or collapsing sections of the propulsion component to reduce the maximum outer diameter of the propulsion component such that it may be withdrawn from the conduit system, and withdrawing the propulsion component through the tubular or through the annulus. Withdrawing the propulsion component may include retracting the propulsion fluid line or fishing the propulsion component out through the tubular or the annulus via a wireline and associated fishing components.

In one or more embodiments, the method may include setting the sealing component, which is a swellable packer, by contacting the swellable packer with a fluid to cause the outer surface of the swellable packer to swell into contact with the inner surface of the conduit and seal the annulus from the conduit not containing the tubular. In one or more other embodiments, the method may include setting the sealing component, which is a mechanical packer, by mechanically expanding a portion of the mechanical packer such that the outer surface of the mechanical packer contacts the inner surface of the conduit and seals the annulus from the conduit not containing the tubular.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A conduit system for conveying fluids comprising:
a conduit having a first end and a distal end;
a tubular positioned radially interior of an inner surface of the conduit along a length of the conduit, the tubular comprising a polymeric material and having a first end proximate the first end of the conduit and a distal end;
a sealing component positioned proximate the distal end of the tubular in an annulus formed between an outer surface of the tubular and the inner surface of the conduit, the sealing component constructed and arranged to seal the annulus; and
a propulsion component positioned proximate the distal end of the tubular, the propulsion component constructed and arranged to provide a force to assist insertion of the tubular into the conduit.

2. The conduit system of claim 1, wherein the propulsion component includes at least one nozzle in fluid communication with a pressurized propulsion fluid.

3. The conduit system of claim 1, wherein the propulsion component further includes at least one retractable section constructed and arranged to retract into an interior of the propulsion component such that the propulsion component can be withdrawn through the tubular.

4. The conduit system of claim 1, wherein the conduit system is a riser system and the conduit includes a riser section and a flowline section, the riser section extending from a position proximate a seabed to proximate a surface of a body of water, the flowline section extending proximate the riser section extending along a length of the seabed proximate a surface of the seabed.

5. The conduit system of claim 4, wherein the distal end of the conduit is proximate to and in fluid communication with subsea equipment positioned proximate a surface of the seabed.

6. The conduit system of claim 5, wherein the tubular extends along substantially the entire length of the riser section of the conduit and the flowline section of the conduit, wherein the first end of the conduit is an end of the riser section proximate the surface of the body of water.

7. The conduit system of claim 4, wherein the conduit system further comprises an additional riser section extending from proximate the flowline section distal the riser section to proximate a surface of the body of water, and wherein the tubular is positioned along at least the additional riser system and at least a portion of the flowline section of the conduit, and wherein the first end of the conduit is an end of the additional riser section proximate the surface of the body of water.

8. The conduit system of claim 4, wherein the flowline section of the conduit extends proximate to onshore facilities, the end of the flowline section proximate the onshore facilities is the first end of the conduit, and the distal end of the conduit is the end of the riser section proximate the surface of the body of water, and wherein the tubular is positioned along at least a portion of the flowline section of the conduit.

9. The conduit system of claim 1, wherein the conduit system is a pipeline system and the conduit is a pipeline, and wherein at least a portion of the pipeline is disposed within a subterranean formation and an end of the pipeline is inaccessible or the dimensional characteristics of the pipeline prevents use of pull-through insertion of the tubular.

10. The conduit system of claim 1, wherein the sealing component is a packer.

11. The conduit system of claim 10, wherein the packer is a swellable packer or a mechanical packer.

12. The conduit system of claim 1, wherein the conduit includes a bend radius of less than 9 D, wherein "D" is the inner diameter of the conduit and the tubular is not positioned within the bend radius.

13. The conduit system of claim 1, wherein the tubular is selected from a liner or a reinforced thermoplastic pipe.

14. The conduit system of claim 13, wherein the tubular is a reinforced thermoplastic pipe.

15. The conduit system of claim 13, wherein the tubular is a liner.

16. A method for reducing corrosion of or providing pressure integrity to a conduit used to convey a fluid comprising:
provinding a conduit, the conduit having a first end and a distal end;
inserting a tubular into the conduit, the tubular having a first end and a distal end, wherein the inserting of the tubular includes using a propulsion component positioned proximate the distal end of the tubular, the propulsion component constructed and arranged to provide a force to assist insertion of the tubular into the conduit; and
setting a sealing component in an annulus formed between an inner surface of the conduit and an outer surface of the tubular, the sealing component positioned proximate the distal end of the tubular and constructed and arranged to seal the annulus.

17. The method of claim 16, wherein the propulsion component includes at least one nozzle in fluid communication with a pressurized propulsion fluid, the at least one nozzle includes an orifice oriented such that a centerline of the orifice forms an angle θ with a longitudinal axis of the tubular of greater than 90 degrees.

18. The method of claim 16, further comprising removing the propulsion component from the distal end of the tubular.

19. The method of claim 18, wherein the removing the propulsion component includes retracting at least one retractable section within an interior of the propulsion component and withdrawing the propulsion component through an interior of the tubular.

20. The method of claim 18, wherein the propulsion component is constructed of a degradable material and the removing the propulsion component includes contacting the propulsion component with a fluid which degrades the propulsion component.

21. The method of claim 16, wherein the sealing component is a swellable packer and the setting the sealing component includes contacting the swellable packer with a fluid to cause an outer surface of the sealing component to swell into contact with the inner surface of the conduit and seal the annulus.

22. The method of claim 16, wherein the sealing component is a mechanical packer and the setting the sealing component includes mechanically expanding a portion of the mechanical packer such that an outer surface of the sealing component contacts the inner surface of the conduit and seals the annulus.

23. The method of claim 16, wherein the tubular is a liner and the method further comprises expanding the liner to be directly adjacent the inner surface of the conduit along substantially the entire length of the liner.

* * * * *